United States Patent
Matoushek

[15] 3,658,228
[45] Apr. 25, 1972

[54] WEB GUIDING MECHANISM
[72] Inventor: Robert J. Matoushek, Rochester, N.Y.
[73] Assignee: Eastman Kodak Company, Rochester, N.Y.
[22] Filed: May 21, 1970
[21] Appl. No.: 39,252

[52] U.S. Cl. ..........................................................226/199
[51] Int. Cl. ........................................................G03b 1/44
[58] Field of Search ..................226/76, 81, 58, 199; 242/76, 242/157 R

[56] References Cited

UNITED STATES PATENTS

| 1,898,141 | 2/1933 | Piper | 226/81 |
| 2,601,790 | 7/1952 | Magnusson | 226/81 X |
| 2,913,093 | 11/1959 | Bevan | 226/81 X |

*Primary Examiner*—Richard A. Schacher
*Attorney*—Robert W. Hampton and Steve W. Gremban

[57] ABSTRACT

A web guiding mechanism to insure proper alignment or registration of one or more webs to be wound in overlapping relation onto a common take-up core. The guiding mechanism comprises a web supporting plate and one or more projections movable between a retracted position, in which the projection does not extend beyond the web supporting surface of the plate, and a web guiding position, in which the projection extends beyond the web supporting surface for guiding an edge of the web.

3 Claims, 3 Drawing Figures

PATENTED APR 25 1972
3,658,228
SHEET 1 OF 2
FIG.1
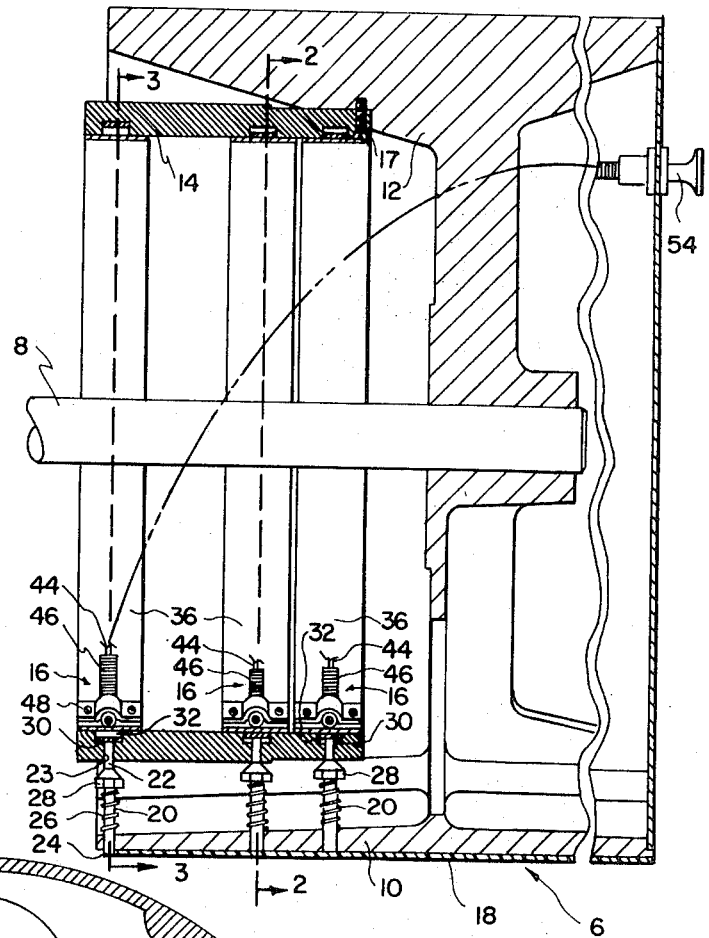
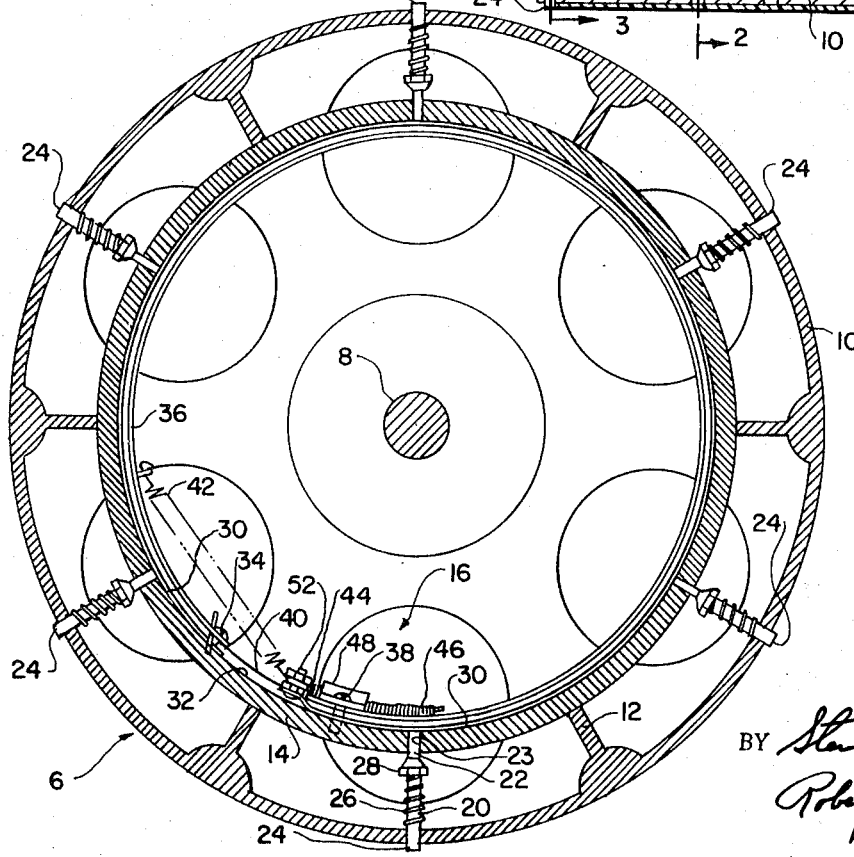
FIG.3
ROBERT J. MATOUSHEK
INVENTOR.
BY Steve W. Trembow
Robert W. Hampton
ATTORNEYS

WEB GUIDING MECHANISM

BACKGROUND OF THE INVENTION

1. Field of the Invention

This invention relates generally to web guiding mechanisms, and more specifically to a web guiding mechanism having a disabled position, in which the web is unguided, and an enabled position, in which the web is guided.

2. Description of the Prior Art

Web guiding mechanisms for guiding a web in proper alignment with a take-up core or the like are well known in the art. In one of such mechanisms, the take-up spindle is provided with a plurality of axially spaced, peripheral grooves for receiving an adjustable flange for varying the axial position of a core onto which the web is wound. The core is mounted on the spindle, and the web is guided onto the core in proper alignment with one edge of the flange. A web guiding mechanism of this type is shown in U.S. Pat. No. 3,017,032.

SUMMARY OF THE INVENTION

This invention includes within its scope a web guiding mechanism movable to an enabled position for guiding a web in proper alignment with a take-up core or the like. Once the alignment is achieved, the web guiding mechanism is disabled. The web guiding mechanism comprises one or more projections movable between a normal retracted position, in which the projection does not extend beyond the web supporting surface, and a web guiding position, in which the projection extends beyond the web supporting surface and guides one edge of the web. In a preferred embodiment of the invention, the web guiding mechanism is mounted on a hollow drum and comprises one or more radially extending pins movable by a pin moving means between the retracted and web guiding positions. The pin moving means is mounted in the hollow portion of the drum and comprises a circular, flexible strip of metal or the like held captive in an annular groove in alignment with the pins, and slidably movable between contracted and expanded positions for moving the pins between retracted and web guiding positions respectively.

One of the objects of the present invention is to provide a web guiding mechanism for guiding a web into proper alignment with a take-up core or the like.

Another object of the invention is to provide a web guiding mechanism that is of simple design and construction, thoroughly efficient and reliable in operation, and economical to manufacture.

Another object of the invention is to provide a web guiding mechanism that is movable between an enabled position for guiding a web, and a disabled position in which the web is unguided.

The invention and its objects and advantages will become more apparent from the detailed description of the preferred embodiment presented below.

BRIEF DESCRIPTION OF THE DRAWING

In the detailed description of the preferred embodiment of the invention presented below, reference is made to the accompanying drawing, in which:

FIG. 1 is a side elevational view in section of the web guiding mechanism of this invention incorporated in a rotatable drum;

FIG. 3 is a section view taken along line 3—3 of FIG. 1.

DESCRIPTION OF THE PREFERRED EMBODIMENT

Figure 2:
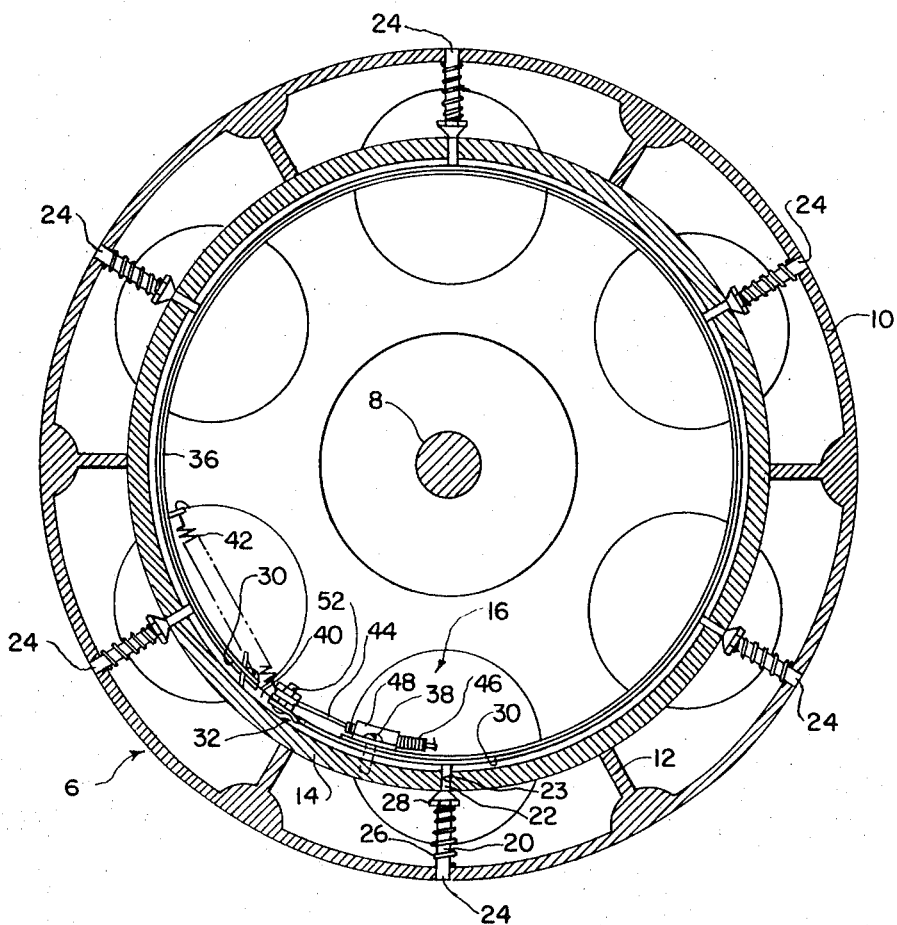
FIG. 2 is a section view taken along line 2—2 of FIG. 1.

With reference to the drawing, the web guiding mechanism of this invention is shown incorporated in any suitable hollow drum 6 secured to a shaft 8 which is rotatably driven by any suitable drive mechanism, not shown. The web guiding mechanism is useful in any web winding application such as a printer or processor in which one or more webs are wound onto a take-up core, not shown, in proper alignment. The web guiding mechanism may also be incorporated in any suitable web supporting mechanism, not shown, having a flat web supporting surface. The hollow drum 6 has a rim 10 with angularly spaced, radially inwardly extending ribs 12 to which an annular housing 14 is rigidly secured by screws 17 or the like for supporting one or more web guiding mechanisms 16. The housing 14 supports a web guiding mechanism 16 for each width of web 18 to be guided. The web guiding mechanism locates one edge of a selected web 18 a predetermined distance from a reference plane, not shown, which is equal to the distance that the same edge of the web is located from the reference plane at the take-up core. Since all of such web guiding mechanisms 16 are substantially identical, only one will be described in detail, and the numerals applied to parts of this web guiding mechanism will be applied to similar parts of the other web guiding mechanisms.

Each web guiding mechanism 16 comprises a plurality of radially oriented pins 20, each pin having one end 22 slidably mounted in a complementary radially extending opening 23 in housing 14, and the opposite end 24 slidably movable in a complementary radially extending opening in rim 10 of the drum 6. A spring 26 encircles the portion of pin 20 between the inner periphery of rim 10 and a self locking nut 28 threaded onto pin 20, and resiliently urges the pin into a retracted position, as best seen in FIGS. 1 and 2, in which one side of nut 28 abuts the outer periphery of housing 14 and the end 24 of the pin is flush with or below the outer peripheral surface of the rim 10. Turning nut 28 or pin 20 allows fine adjustment of pin end 24 relative to the outer surface of rim 10.

A pin moving means is provided for moving the pins 20 between the above-described retracted position and a web guiding position, in which the ends 24 of the pins protrude beyond the outer peripheral surface of the drum rim 10, as best seen in FIGS. 1 and 3. This pin moving means comprises a flexible circular strip 30 of metal or the like mounted in an annular groove 32 in alignment with openings 23 and on the inner peripheral surface of housing 14. One end of circular strip 30 is secured to a fixed pin 34 on housing 14, and the opposite end is free for slidable movement in a circumferential direction relative to the fixed end. The strip 30 is held captive in groove 32 by a flexible band 36 mounted within housing 14 and having a clearance opening at one end for receiving fixed pin 34, and the opposite end secured to housing 14 by any suitable screws 38 or the like. The ends of band 36 are spaced apart to form a slot 40 into which the free end of strip 30 extends. Any suitable spring 42, shown schematically in FIGS. 2 and 3, is provided having one end secured to the free end of strip 30 and the opposite end secured to housing 14 for slidably urging strip 30 into its contracted position, in which the strip tightly encircles band 36 as best seen in FIGS. 1 and 2. In this contracted position, the strip 30 is out of engagement with ends 22 of pins 20 allowing the pins to be moved by their springs 26 into their retracted positions. The strip 30 may be slidably moved against the bias of spring 42 into a fully expanded position, as best seen in FIGS. 1 and 3, by any suitable push-pull cable 44 slidably mounted within a fixed sheath 46 having one end secured to housing 14 by a washer 48 and screws 38, and its other end secured to a face plate 50 on one end of drum 6. One end of cable 44 is secured to the free end of strip 30 by any suitable bolts 52, and its opposite end secured to a knob 54. By manually pulling knob 54 on the push-pull cable 44, the cable slidably moves strip 30 to its fully expanded position, in which the strip engages pins 20 and moves them into their web guiding positions as best seen in FIGS. 1 and 3 for guiding a web in proper alignment with a take-up core for wind up. Following the alignment operation, the knob 54 is released, spring 42 returns strip 30 to its normal contracted position, and springs 26 urge pins 20 to their normal retracted positions.

The invention has been described in detail with particular reference to a preferred embodiment thereof, but it will be understood that variations and modifications can be effected within the spirit and scope of the invention as described hereinabove.

I claim:
1. A web guiding mechanism which comprises:
a hollow drum for supporting a web;
a plurality of pin members for guiding a web for support by said drum;
means for supporting said pin members within said drum for movement between a web guiding position, wherein said pin members extend externally of said drum to guide a web for support by said drum, and an idle position, wherein said pin members do not extend externally of said drum; and
means disposed within said drum for moving said pin members between said web guiding and idle positions, said pin member moving means including:
resilient urging means for moving said pin members to said idle position;
a flexible movable strip member disposed in abutment against said pin members and movable between expanded and contracted positions; and
means for moving said strip member between said expanded position, for moving said pin members to said web guiding position, and said contracted position, for enabling said resilient urging means to move said pin members to said idle position.

2. A web guiding mechanism as recited in claim 1 wherein said strip member has opposite ends and is disposed generally in a loop within said drum and wherein said pin member moving means further includes:
means for fixing one of said strip member ends to said drum so as to enable another of said strip member ends to move relative to said drum.

3. A web guiding mechanism as recited in claim 2, wherein said drum has an interior surface, and wherein said pin member moving means further includes:
means defining a groove in said interior drum surface for receiving said strip member, and which extends in alignment with said pin members.

* * * * *